(12) United States Patent
Gummig (10) Patent No.: US 10,484,466 B2
(45) Date of Patent: Nov. 19, 2019

(54) METHODS AND SYSTEMS FOR COMMUNICATING MESSAGES TO PASSENGERS ON A TRANSPORTATION VEHICLE

(71) Applicant: Panasonic Avionics Corporation, Lake Forest, CA (US)

(72) Inventor: Jared Gummig, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 162 days.

(21) Appl. No.: 15/421,864

(22) Filed: Feb. 1, 2017

(65) Prior Publication Data

US 2018/0219943 A1 Aug. 2, 2018

(51) Int. Cl.
*G06F 15/173* (2006.01)
*H04L 29/08* (2006.01)
*H04L 29/06* (2006.01)

(52) U.S. Cl.
CPC ........ *H04L 67/104* (2013.01); *H04L 65/4084* (2013.01); *H04L 67/12* (2013.01); *H04L 67/16* (2013.01)

(58) Field of Classification Search
CPC ... H04L 67/104; H04L 65/4084; H04L 67/12; H04L 67/16
USPC ........................................................ 709/227
See application file for complete search history.

(56) References Cited

U.S. PATENT DOCUMENTS

| 6,147,980 | A | * | 11/2000 | Yee ..................... H04B 7/18508 370/316 |
| 6,938,258 | B1 | | 8/2005 | Weinberger et al. |
| 7,028,304 | B1 | * | 4/2006 | Weinberger ............ G06Q 10/10 709/227 |
| 8,997,159 | B2 | | 3/2015 | Ogilvie |
| 9,061,209 | B2 | | 6/2015 | Bieler |
| 2008/0141315 | A1 | | 6/2008 | Ogilvie |
| 2013/0029701 | A1 | * | 1/2013 | Cabos ................ H04B 7/18502 455/466 |
| 2013/0158991 | A1 | * | 6/2013 | Dong ................... G08G 5/0013 704/235 |

OTHER PUBLICATIONS

"Electronic Mail-Based Vehicle Crew Messaging", U.S. Appl. No. 14/856,385, filed Sep. 16, 2015.

* cited by examiner

*Primary Examiner* — Sm A Rahman
(74) *Attorney, Agent, or Firm* — Klein, O'Neill & Singh, LLP (57) ABSTRACT

Computing technology for a transportation vehicle is provided. For example, the computing technology executes a method for generating an encrypted message by a computing device for a passenger of a transportation vehicle, based on an identifier identifying the transportation vehicle and a passenger seat identifier identifying a passenger seat; providing the encrypted message to a processor executable entertainment system of the transportation vehicle; decrypting the encrypted message and validating the passenger seat identifier based on an authorized login by the passenger to the entertainment system while the passenger is on the transportation vehicle; and after validation, presenting the decrypted message to a device accessible to the passenger.

20 Claims, 7 Drawing Sheets

METHODS AND SYSTEMS FOR COMMUNICATING MESSAGES TO PASSENGERS ON A TRANSPORTATION VEHICLE

TECHNICAL FIELD

The present disclosure relates to transportation vehicles in general and more particularly, to computing technology for efficient and secure message communication to passengers on a transportation vehicle.

BACKGROUND

Transportation vehicles, for example, aircraft, trains, buses, recreation vehicle, boats and other similar vehicles use various computing devices for providing various functions, including entertainment, system control, content storage, and other functions. These computing devices include hardware (for example, servers, switches, network interface cards, storage adapters, storage devices and others) and software (for example, server applications, operating systems, firmware, management applications, application programming interface (APIs) and others).

Transportation vehicles today have individualized functional equipment dedicated to a particular passenger seat, which can be utilized by the passenger, such as adjustable seats, adjustable environmental controls, adjustable lighting, telephony systems, video and/or audio entertainment systems, crew communication systems, and the like. Many commercial airplanes today have individualized video and audio entertainment systems, often referred to as "inflight entertainment" or "IFE" systems. Such systems may also be referred to as "inflight entertainment and communication" systems as well, and typically abbreviated as "IFEC" systems.

As one example of a passenger seat function, the entertainment systems for passenger carrier vehicles, such as commercial airlines, often have video displays installed at each passenger seat. For instance, video displays may be provided at each passenger seat, such as mounted at each of the seats of the passenger seats, and/or on cabin walls and/or deployable from an armrest for seats located at a bulkhead, i.e., in the first row of a section. Many of these systems allow each passenger to select from multiple video channels and/or audio channels, or even individually select and play videos from a library of videos. These video displays may also provide access to games, communication applications (e.g., telephone service, messaging, etc.), Internet browsing, and other computer applications. Sometimes such displays are referred to as smart monitors due to the ability to provide computer applications and process and store data internally.

It has also become quite commonplace for travelers to carry personal electronic devices having wireless communication capability, such as cellular phones, smart phones, tablet computers, laptop computers, and other portable electronic devices. This includes passengers traveling on all types of transportation including the vehicles of common carriers, such as airplanes, passenger trains, buses, cruise ships, sightseeing vehicles (e.g., ships, boats, buses, cars, etc.). Many of these personal electronic devices have the capability to execute application software programs ("apps") to perform various functions, including controlling other devices and systems.

Efficient and secure communication with passengers and crew members can improve overall travel experience. Continuous efforts are being made to develop computing technology to improve communication with passenger and crew on transportation vehicles.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, innovative computing technology is disclosed herein that enables sending messages to passengers and/or crew members of a transportation vehicle. The messages are generated from computing devices that are remote to the transportation vehicle. The systems and processes implementing the computing technology are now described in detail below.

Figure 1A:
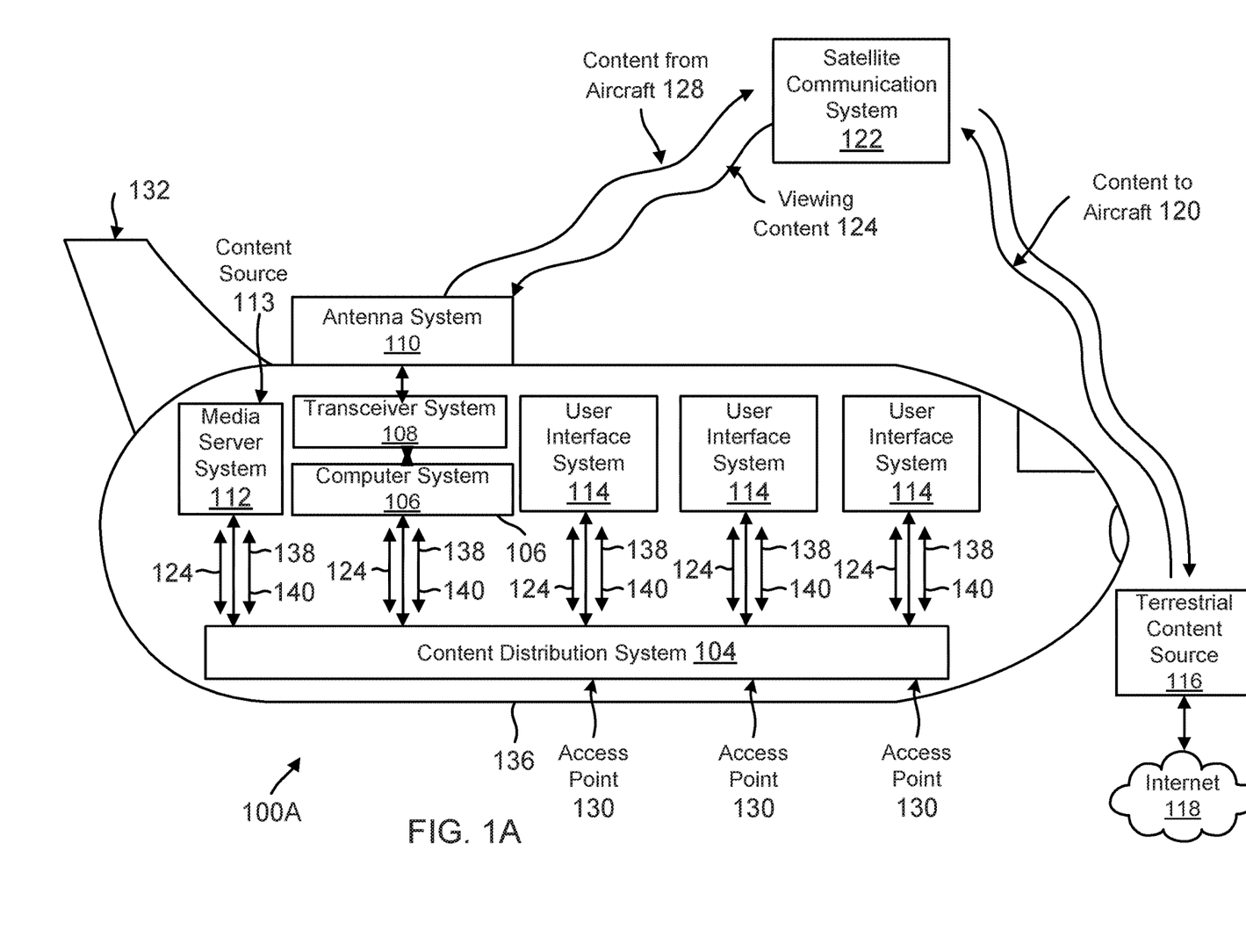
FIG. 1A shows an example of an operating environment for implementing the various aspects of the present disclosure on an aircraft.

Vehicle Information System:

FIG. 1A shows an example of a vehicle information system 100A (also referred to as system 100A) with innovative computing technology of the present disclosure for installation aboard an aircraft 132 for communicating with passengers and crew members, according to one aspect of the present disclosure. When installed on an aircraft, system 100A can comprise an aircraft passenger IFE system, such as the Series 2000, 3000, eFX, eX2, eXW, and/or any other inflight entertainment system developed and provided by Panasonic Avionics Corporation (without derogation of any trademark rights of Panasonic Avionics Corporation) of Lake Forest, Calif., the assignee of this application.

System 100A comprises at least one content source 113 and one or more user (or passenger) interface systems (may also be referred to as a seat device/seatback device) 114 that communicate with a real-time content distribution system 104. The content sources 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124, including pre-programmed viewing content and/or content 120 downloaded to the aircraft, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or a hard disk drive (HDD) system, of any suitable kind, for storing the preprogrammed content and/or the downloaded viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive content 120 from a selected terrestrial content source 116 and/or transmit (upload) content 128, including navigation and other control instructions, to the terrestrial content source 116. As desired, the terrestrial content source 116 can be configured to communicate with other terrestrial content sources (not shown). The terrestrial content source 116 is shown as providing access to the Internet 118. Although shown and described as comprising the satellite communication system 122 for purposes of illustration, the communication system can comprise any conventional type of wireless communication system, such as a cellular communication system (not shown) and/or an Aircraft Ground Information System (AGIS) communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive content 120 from the terrestrial content source 116 including messages from a ground server for passengers/crew and provide the content 120, as processed by the transceiver system 108, to a computer system 106 of system 100A. The computer system 106 can provide the received content 120 to the media (or content) server system 112 and/or directly to one or more of the user interfaces 114 including a personal electronic device (PED) as viewing content 124, as desired. Although shown and described as being separate systems for purposes of illustration, the computer system 106 and the media server system 112 can be at least partially integrated.

The user interface system 114 may be computing terminals in communication with an access point 130. The user interface system 114 provides a display device to view content as well as any messages from the airline sent by a ground server. The user interface system 114 includes a hardware interface to connect to an access point 130 that provides a wired and/or a wireless connection for the user interface system. In at least one embodiment, the user interface system 114 comprises a software application that a user downloads and installs on a PED to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, a Wi-Fi connection or for any other reason, payment information likewise can be entered via the input system. The input system can be provided in any conventional manner and typically includes a touch screen, one or more switches (or pushbuttons), such as a keyboard or a keypad, and/or a pointing device, such as a mouse, trackball, or stylus.

In one aspect, the user interface system 114 is provided at individual passenger seats of aircraft 132. The user interface system 114 can be adapted to different aircraft and seating arrangements and the adaptive aspects described herein are not limited to any specific seat arrangements or user interface types.

Figure 1B:
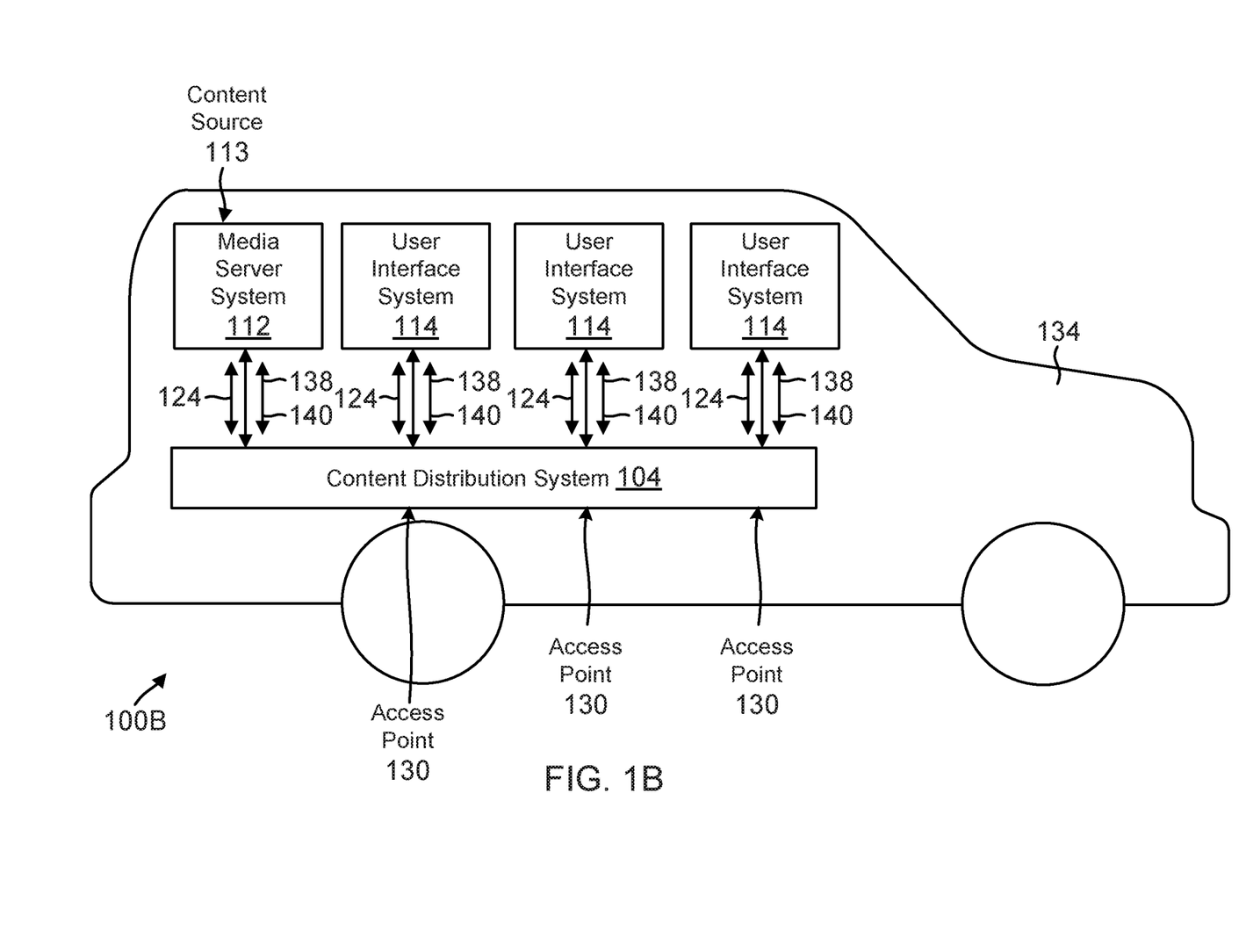
FIG. 1B shows an example of the operating environment on a non-aircraft transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
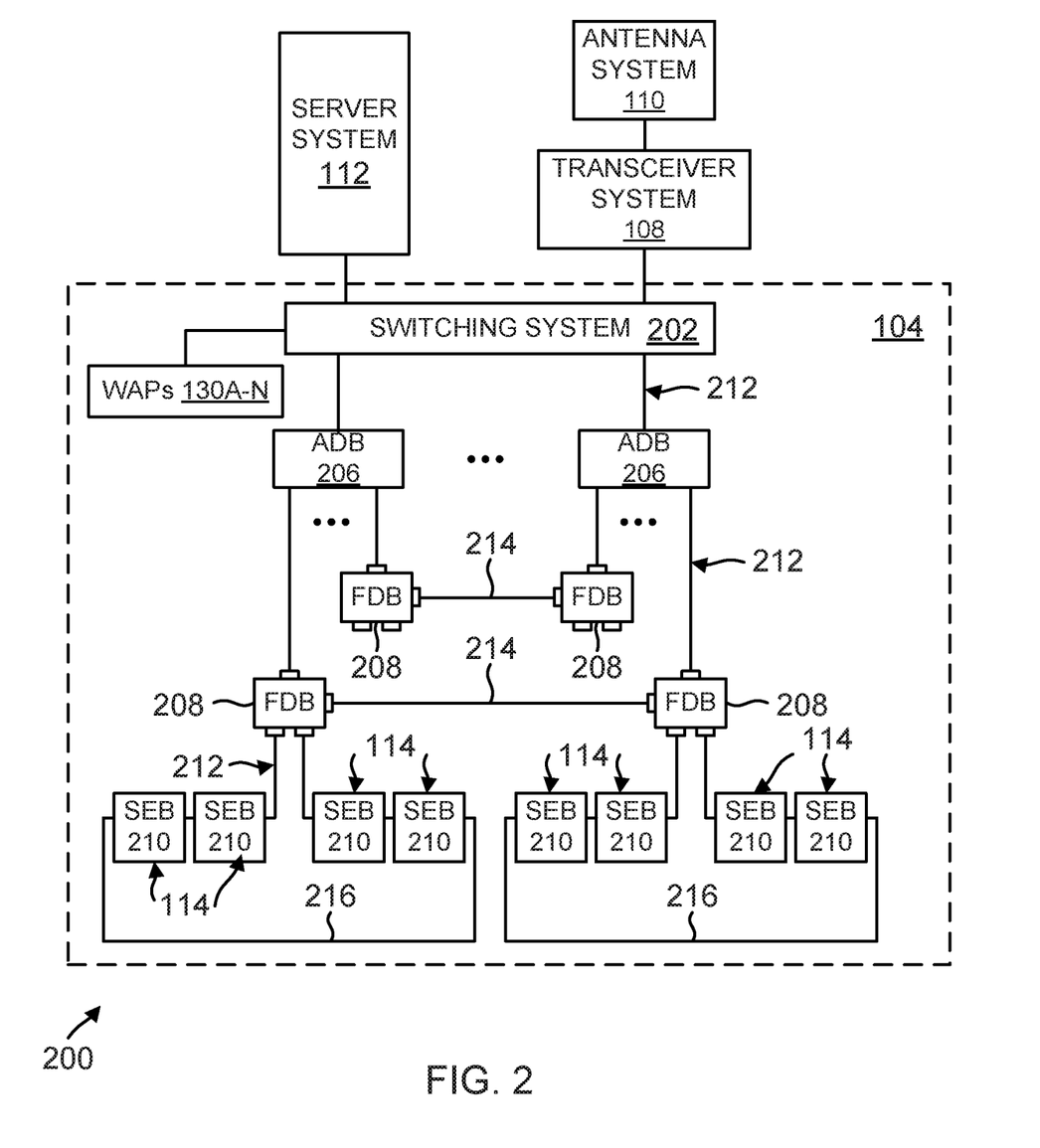
FIG. 2 shows an example of a communication system on an aircraft, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN) of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs), collectively shown as SEB) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more WAPs (130A to 130N) connected in communication with the switch system 202 for wireless distribution of content to user interface systems 114 including PEDs.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of SEBs 210. The SEBs 210, in turn, are configured to communicate with the user interface systems 114. Each SEB 210 can support one or more of the user interface systems 114.

The switching systems 202, the area distribution boxes 206, the floor disconnect boxes 208, the SEBs 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 can include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last SEB 210 in each daisy-chain of SEBs 210 for a selected floor disconnect box 208 as shown in FIG. 2. Each SEB loopback connection 216 therefore forms a loopback path among the daisy-chained SEBs 210 coupled with the relevant floor disconnect box 208.

It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3:
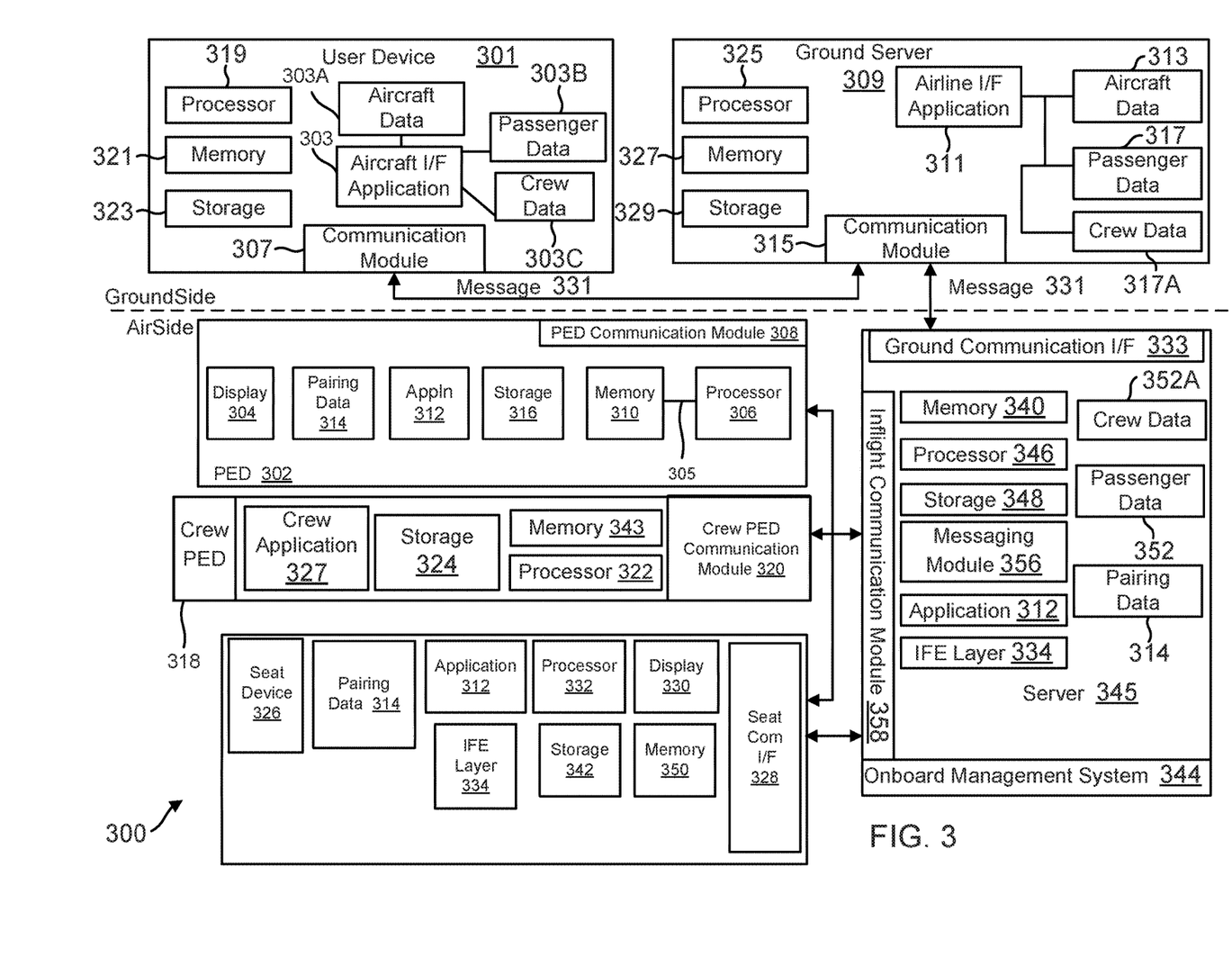
FIG. 3 shows an example of a system for communicating with crew and passengers on a transportation vehicle, according to one aspect of the present disclosure.

Messaging System 300:

In one aspect of the present disclosure, FIG. 3 shows an example of a system 300 that may implement the innovative computing technology of the present disclosure. The system 300 is used to present a message 331 on one or more PEDs 302 with or without a seat device (may also be referred to as seatback device) 326 and when applicable, one or more crew devices 318 of an aircraft. The message 331 may be generated by a user device 301 and forwarded to a ground server 309. The ground server communicates the message 331 to an onboard management system 344 of the aircraft.

The onboard management system 344 may be similar to computer system 106 and/or server 112 described above with respect to FIGS. 1A/1B. The seat device 326 may be part of the user interface system 114 or interfaces with the user interface system 114 described above with respect to FIGS. 1A/1B. It is noteworthy that the seat device 326 need not be mounted on the back of a seat and may be supported from other structures, such as a bulkhead, wall, arm of a seat, etc. The adaptive aspects of the present disclosure are not limited to any specific location or orientation of the seat device 326.

In one aspect, an authorized user of an airline using device 301 generates the message 331. The message 331 may be for (1) a specific passenger based on a passenger seat number and an aircraft identifier (ID) (for example, an aircraft tail number that is used to uniquely identify an aircraft), (2) the passengers for a specific cabin class based on an aircraft ID, (3) all the passengers of an aircraft using the aircraft ID, (4) a specific passenger based on passenger name, (5) a specific crew member based on a crew member name or crew member ID, (6) all the crew members of an aircraft based on aircraft ID, or (7) a combination of any of the foregoing options. In addition, the message 331 may be for (i) passenger based on a passenger seat number, aircraft ID and flight number, (ii) the passengers for a cabin class based on an aircraft ID and flight number, and (iii) all the crew members of an aircraft based on aircraft ID and flight number, or (iv) a combination of any of the foregoing, including (1) through (7).

The user device 301 may be a mobile phone, a notebook, a tablet, a laptop or any other similar device. The user device 301 may include a processor 319 that has access to a memory 321 via an interconnect or bus (not shown) for executing stored instructions. Processor 319 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The user device 301 also includes a storage device 323 that may be, or may include any storage medium for storing data in a non-volatile manner, such as one or more magnetic or optical based disks, flash memory, or solid-state drive. The storage device 323 may be used to store an aircraft interface application 303 (may be referred to "application 303") and executed out of memory 321.

In one aspect, application 303 has access to aircraft data 303A, passenger data 303B and crew data 303C. The aircraft data 303A includes aircraft identifier information for a plurality of aircraft, aircraft details, for example, the type of IFE system that is deployed on the aircraft, seat device capability information, aircraft routes, flight details and status or any other aircraft related information. The passenger data 303B may include passenger name, passenger cabin class, assigned passenger seat number, passenger preferences and other information. The crew member data 303C includes names and identification information of the crew members as assigned to specific aircraft/flights, identity and capability information of crew member PEDs 318 including device type, device Id, device connection data and any other crew member information. The crew member data 303C identifies crew members for specific flights with crew member device information. The aircraft data 303A, the passenger data 303B and the crew member data 303C may be stored as one or more data structures/objects on the storage device 323 or accessible to user device 301 via a network connection.

In one aspect, application 303 generates the message 331 for one or more recipients. The message 331 may be encrypted using Advanced Encryption Standard (AES) or any other encryption type. The adaptive aspects described herein are not limited to any specific type or encryption standard.

The encrypted message 331 is sent to the ground server 309 via a communication module 307 of the user device 301. The communication module 307 includes logic and circuitry to enable network communication using a wired or wireless connection. In one aspect, the communication module 307 includes a network interface card to enable Ethernet based wired communication. In another aspect, communication module 307 includes a wireless card/interface for wireless communication.

The encrypted message 331 from user device 301 is received by the communication module 315 of the ground server 309. The communication module 315 also includes logic and circuitry to enable network communication using a wired or wireless connection. In one aspect, communication module 315 may also include a network interface card to enable Ethernet based wired communication. In another aspect, the communication module 315 may also include a wireless card for wireless communication.

The ground server 309 also include a processor 325 that has access to a memory 327 via an interconnect/bus (not shown) for executing processor executable instructions. Processor 325 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The ground server 309 also includes a storage device 329 that may be, or may include any storage medium for storing data in a non-volatile manner, such as one or more magnetic or optical based disks, flash memory, or solid-state drive. The storage device 329 may store an airline interface application 311 (may be referred to application 311) that is executed out of memory 327.

In one aspect, application 311 has access to aircraft data 313, passenger manifest (or data) 317 and crew member manifest/data 317A that may be stored on storage device 329. The aircraft data 313 includes aircraft identifier information, airline information, aircraft details, for example, the type of IFE system that is deployed on different aircraft, seat device capability information, aircraft routes and other details. The passenger data 317 may include passenger name, passenger cabin class, assigned passenger seat number, passenger preferences, passenger device details and other information. The crew member data 317A identifies crew members for specific flights with crew member device information, for example, device type, device Id, device connection data and any other crew member information.

Application 311 decrypts the encrypted message 331, identifies the target aircraft associated with the message after validating the aircraft information with aircraft data 313. Passenger information is also validated with passenger data 317.

When message 331 is for one or more crew member, application 311 obtains crew data 317A upon authorization by the airline for identifying a current aircraft ID and a current device ID of the crew members. Once the target aircraft is identified, the encrypted message 331 is sent to the aircraft with the identified crew device(s). In one aspect, the encrypted message 331 may be sent to the onboard management system 344 using a cellular modem, a Ku satellite broadband connection, Ka satellite broadband connection, swift broadband connections, ACARs, Data-3 satellite broadband connection, a Wi-Fi connection or any other connection type. Depending on the hardware configuration of the ground server 309, the communication module 315 includes the proper logic, circuitry and firmware to enable the connection with the onboard management system 344. It is noteworthy that the adaptive aspects described herein are not limited to any specific connection/network type.

In one aspect, a ground communication interface 333 of the onboard management system 344 receives the message 331. The message 331 is parsed, decrypted the message and then distributed to the intended recipients, as described below in detail. In one aspect, when the message is for one or more passengers, the onboard system 344 confirms passenger identity/location based a confirmation that the passenger has logged into the IFE system or any other form of pairing with the seat location. In addition, the message may be intercepted by a crew member that confirms that the target passenger is in the target seat or to select the appropriate seat.

In one aspect, the onboard management system 344 includes a server 345 that may be similar to media server 112 and/or computer system 106 described above. The server 345 includes a processor 346 with access to a memory 350 via a bus system, similar to bus 305 described below in detail. Processor 346 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Processor 346 also has access to a storage device 348 that may be used to store data, applications and program files. In one aspect, server 345 maintains passenger data 352 (may also be referred to as passenger manifest data 352) that identifies each passenger of a flight, a seat assigned to a passenger and any other information that can uniquely identify the passenger. The passenger data 352 may be populated from an electronic boarding pass that is used by a passenger and/or from the carrier operating the aircraft.

Server 345 also includes a messaging module 356 that is executed by the processor 346 out of memory 350 to transmit the message 331 to the intended recipient, as described below in detail with respect to FIGS. 4A-4B.

In one aspect, server 345 may also store pairing data 314 for PEDs that are paired to the IFE system 334, as described below. The pairing data 314 identifies a passenger and a passenger device that is logged into the IFE system 334. The pairing data 314 may be used to validate a passenger's seat before transmitting the message 331 to the passenger device.

Server 345 also maintains information regarding crew members in data structure 352A. The crew member data includes identity of each crew member, crew member device identification, connection status of crew member indicating if a device is connected or disconnected and any other crew member information. Data structure 352A is used to validate a crew member device before transmitting the message 331 to one or more crew members.

In one aspect, server 345 communicates with one or more PEDs 302, seat device 326 and crew member PEDs 318 via an inflight communication module 358. The inflight communication module 358 includes one or more interfaces for a wired and/or wireless connection, as described above with respect to FIGS. 1A/1B and 2. It is noteworthy that module 358 may also include the logic/circuitry for ground communication interface 333.

In one aspect, PED 302 may be a mobile phone, a notebook, a tablet, a laptop or any other similar device. PED 302 may include a processor 306 that has access to a memory 310 via an interconnect/bus 305 for executing stored instructions. Processor 302 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. The bus system 305 is an abstraction that represents any one or more separate physical buses and/or point-to-point connections, connected by appropriate bridges, adapters and/or controllers. The bus system 305, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The PED 302 includes a storage device 316 that may be, or may include any storage medium for storing data in a non-volatile manner, such as one or more magnetic or optical based disks, flash memory, or solid-state drive. The storage device 316 may be used to store content displayed on a display 304 of PED 302. In one aspect, display 304 may include a touch screen for receiving input commands.

The storage device 316 may also store an application (may be referred to as companion application or pairing application) 312 and executed out of memory 310. In one aspect, application 312 enables the PED 302 to automatically pair with an aircraft system in general and to the seat device 326 executing the IFE layer 334. This can be used to validate a passenger seat to disseminate message 331 to the appropriate passenger.

PED 302 may also store pairing data 314 that includes pairing information for securely pairing the PED 302 with the seat device 326. In one aspect, the pairing data 314 includes PED 302 identification information, as well as configuration information to pair the PED 302 including a seat identifier.

In one aspect, application 312 may be stored on a non-transitory storage medium, such as a hard drive, CD, CD-ROM, DVD, flash memory, or any other storage device (volatile or non-volatile), etc. As an example, application 312 may be stored on a storage device of an application store ("App Store") (not shown) such as that operated by Apple, Inc. under the trademark ITUNES, the application store operated by Google, Inc. under the trademark GOOGLE PLAY, or the application store operated by Microsoft Corporation under the trademark WINDOWS STORE. Alternatively, the app store may be a website server for a website operated by a provider of the on-board management system 344 such as the manufacturer or a carrier operating the vehicle (e.g., a commercial airline, train operator, cruise line, bus line, etc.).

It is noteworthy that application 312 may be executed in part by seat device 326 and/or the onboard management system 344 to assist in PED pairing. The adaptive aspects described herein are not limited to any specific location for executing application 312.

The term "pair", and other grammatical forms such as "pairing", means that the PED 302 is associated with a particular passenger seat such that communications received by seat device 326 from the PED 302 are recognized as being related to that passenger seat and/or such communications control seat functions associated with the particular passenger seat and controlled by a seat function controller (not shown). The term automatic as associated with pairing means that the PED is paired with minimal passenger involvement.

In one aspect, a PED communication module 308 enables communication with server 345 and seatback device 326. As an example, the PED communication module 308 includes one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the PED communication module 308 for convenience, the communication module 308 may have different interface, cards, logic and circuitry to comply with the different communication protocols/standards.

In one aspect, the crew PED 318 may be similar to PED 302 and may include a mobile phone, a notebook, a tablet, a laptop or any other similar device. Crew PED 318 may also include a processor 322 that has access to a memory 343 via an interconnect or bus for executing stored instructions. Processor 322 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The crew PED 318 includes a storage device 324 that may be, or may include any storage medium for storing data in a non-volatile manner, such as one or more magnetic or optical based disks, flash memory, or solid-state drive.

The storage device 324 may also store an application 327 (may be referred to as crew management interface) and executed out of memory 343. In one aspect, application 327 enables the crew PED 318 to interface with onboard management system 344 via crew PED communication module 320. The crew communication module 320 includes one or more interfaces to communicate with different devices, including a Wi-Fi interface, Bluetooth interface, NFC (Near Field Communication) interface and others. The adaptive aspects described herein are not limited to any specific interface. It is noteworthy that although a single block is shown for the communication module 320 for convenience, the communication module 320 may have different interface, cards, logic and circuitry to comply with the different communication protocols/standards.

In one aspect, the seat device 326 includes a display device or simply "display" 330, a processor 332, a memory 340, a communication interface 328 and a local storage device 342 for storing content. The seat device 326 receives user input/requests via an input module (not shown). The input module may be configured to use a local touch screen at display 330, a local virtual keyboard, an external mouse, external keyboard or any other input device. The various adaptive aspects described herein are not limited to any specific input device.

Processor 332 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

In one aspect, processor 332 executes the IFE layer 334 that provides inflight entertainment and other options to users. The IFE layer 334 uses the communication interface 328 to interface with the PED 302 and/or onboard management system 344. The IFE layer 334 provides audio/video content as well as controls for accessing the content. The IFE layer 334 may also transmit and display message 331 to a passenger, when the message is intended for one or more passengers.

In one aspect, the seat device 326 also stores pairing data 314 and may include details of PED 302, for example, a PED identifier, a seat identifier or any other PED data that can be used for authenticating a PED device for a pairing request. This information may also be used to validate a passenger seat number before displaying message 331 described below with respect to FIGS. 4A-4B.

It is noteworthy that although the foregoing system 300 has been described as an example for one or more aircraft, the same innovative computing technology may be applied to other transportation vehicles, including trains, buses, ships and other vehicles.

Figure 4A:
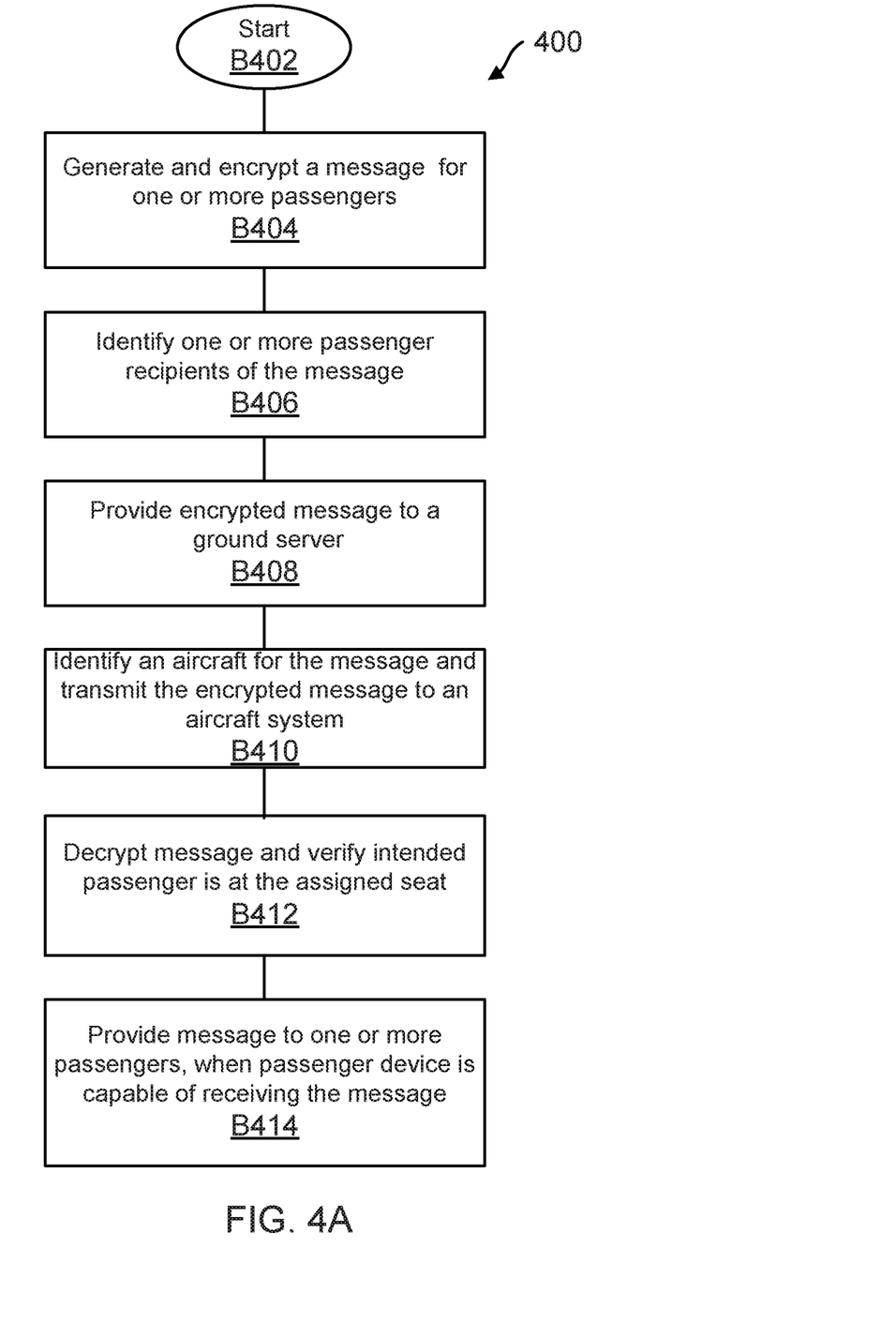
FIG. 4A shows a process flow for communicating with one or more passengers of an aircraft, according to one aspect of the present disclosure.

Process Flow:

FIG. 4A shows a process 400 executed by the innovative computing technology of the present disclosure for distributing the message 331 to one or more passengers, according to one aspect of the present disclosure. The process 400 begins in block B402 when the user device 331 is operational.

In block B404, an airline personnel using the user device 301 generates the message 331. The message may include any information.

Application 303 generates the message using aircraft data 303A/passenger data 303B. In block B406, one or more passenger is identified. The message 331 may be for a specific passenger based on an aircraft ID and passenger seat number, for passengers of a specific cabin class based on an aircraft ID, for all passengers of an aircraft based on an aircraft ID, a specific passenger based on a passenger name or any other identifier. In addition, the message may be directed based on a flight number in combination with the other information. The message 331 may be encrypted by application 303. The encryption may be AES based or of any other type. The encrypted message 331 is sent to the ground server 309 via communication module 307 in block B408.

The ground server 309 executing application 311 receives the encrypted message 331 message and decrypts the encrypted message. Application 311 identifies the target aircraft for the message using aircraft data 313 and/or passenger data 317. The encrypted message 331 is then transmitted to the identified aircraft by the ground server 309 in block B410.

The message is received by the onboard server 345 in block B412. The messaging module 356 decrypts the message and determines the identity of one or more recipients. When the message is only for a specific passenger, the passenger seat is first confirmed/validated. This may be implemented by verifying if the specified passenger has logged into the IFE system 334 and/or if a PED is paired with the seat device 326. If the passenger PED is paired, then the messaging module 356 ascertains the capability of the PED to display message 331. The messaging module 356 may also access the passenger data 352 to ascertain passenger preference to receive a message on the PED 302 or the display of the seat device 326, when the seat device 326 is installed and available.

Based on the analysis in block B412, the message is transmitted to one or more devices for one or more passengers in block B414.

Figure 4B:
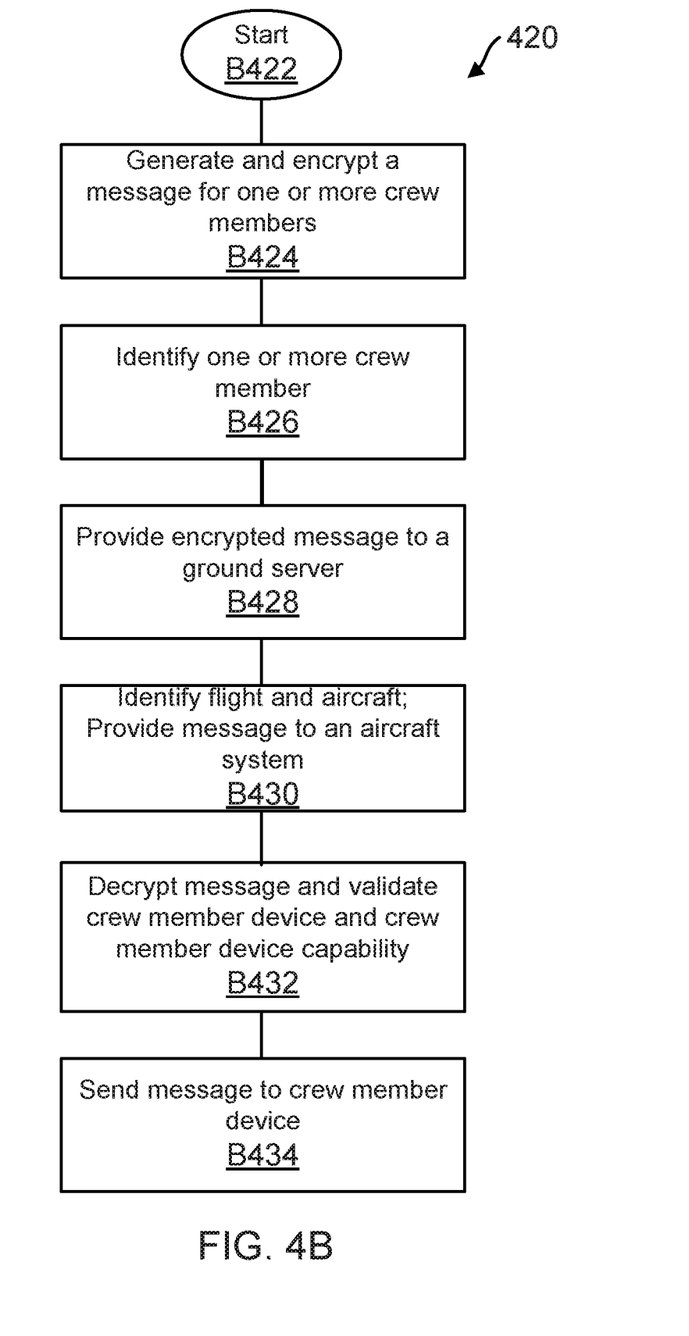
FIG. 4B shows a process flow for communicating with one or more aircraft crew members, according to one aspect of the present disclosure.

FIG. 4B shows a process 420 for distributing the message 331 to one or more crew members, according to one aspect of the present disclosure. The process 420 begins in block B422 when user device 301 is operational. An authorized airline personnel using user device 301 generates the message 331 in block B424.

In block B406, one or more crew member is identified based on a crew member name/aircraft identifier when the message is for a specific crew member. When the message is for all crew members of an aircraft, then the message is based on an aircraft ID. Application 303 generates the message using aircraft data 303A/crew member data 303C. The message 331 is encrypted by application 303 using AES or any other encryption technique and then sent to the ground server 309 via communication module 307 in block B428.

The ground server 309 executing application 311 receives the message and decrypts the message in block B430. Application 311 identifies the target aircraft and a crew member device for the message using aircraft data 313 and crew member data 317A, respectively. The encrypted message 331 is then transmitted to the identified aircraft by the ground server 309.

The message is received by the onboard server 345 in block B432. The messaging module 356 decrypts the message and first determines the identity of one or more recipients. When the message is only for a specific crew member, then the crew member device connection is confirmed using crew data 352A. This may be implemented by verifying if the crew member has logged into the aircraft management system.

Based on the determination in block B432, the message is transmitted to one or more devices for one or more crew members in block B434.

It is noteworthy that although processes 400 and 420 have been described above with respect to aircraft, aircraft passengers and crew members, the same innovative computing technology can be implemented on trains, buses, ships, RVs and other vehicles without undue experimentation.

In one aspect, novel computing technology is disclosed for generating an encrypted message by an airline computing device for an aircraft passenger, based on an aircraft identifier identifying the aircraft and a passenger seat identifier identifying a passenger seat; providing the encrypted message to a ground server; identifying the aircraft by the ground server and transmitting the encrypted message to an onboard computing device; decrypting the encrypted message by the onboard computing device; validating the passenger seat identifier based on an authorized login by the passenger to an inflight entertainment system; and upon validation, presenting the decrypted message to a device accessible to the passenger by the inflight entertainment system.

In another aspect, computing technology methods for a transportation vehicle is provided. For example, the computing technology includes generating an encrypted message by a computing device for a passenger of a transportation vehicle, based on an identifier identifying the transportation vehicle and a passenger seat identifier identifying a passenger seat, where the computing device is located outside of the transportation vehicle; providing the encrypted message to a processor executable entertainment system of the transportation vehicle; decrypting the encrypted message and validating the passenger seat identifier based on an authorized login by the passenger to the entertainment system while the passenger is on the transportation vehicle; and upon validation, presenting the decrypted message to a device accessible to the passenger.

Figure 5:
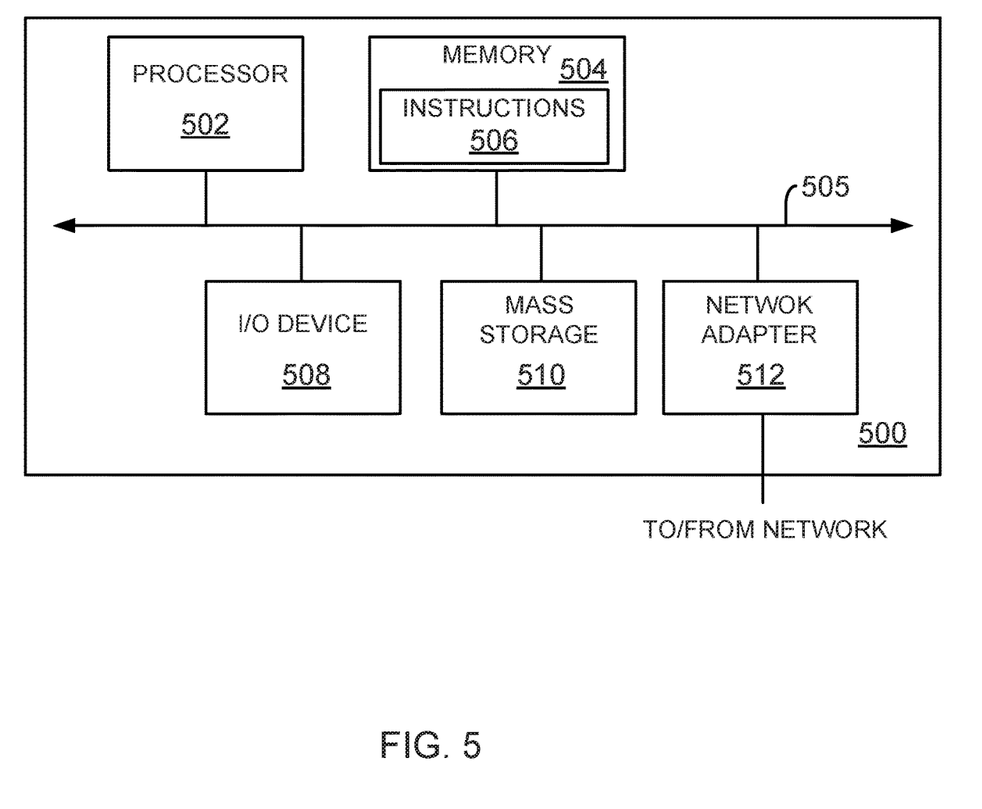
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent user device 301, ground server 309, media server 112, computing system 106, WAP 130, onboard management system 344, seat device 326 or any user device (PED 302) that attempts to interface with a vehicle computing device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the various data structures if FIG. 3 and/or the various process steps of FIGS. 4A-4B described above in detail.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for transmitting messages to transportation vehicle passengers/crew members have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A method for communicating a message to a passenger on a transportation vehicle, the method comprising:

generating an encrypted message by a computing device for a passenger of a transportation vehicle, based on an identifier identifying the transportation vehicle and a passenger seat identifier identifying a passenger seat; wherein the computing device is located outside of the transportation vehicle;

providing the encrypted message to a processor executable entertainment system of the transportation vehicle;

decrypting the encrypted message and validating the passenger seat identifier based on an authorized login by the passenger to the entertainment system while the passenger is at the transportation vehicle and pairing of a passenger electronic device with the entertainment system; and after validation, presenting the decrypted message to a device accessible to the passenger.

2. The method of claim 1, wherein the encrypted message is for all passengers of the transportation vehicle identified by the identifier.

3. The method of claim 1, wherein the encrypted message is generated using a passenger name aboard the transportation vehicle.

4. The method of claim 1, wherein when the encrypted message is for a crew member of the transportation vehicle, the decrypted message is presented to a crew member device connected to a transportation vehicle computing network.

5. The method of claim 1, wherein the encrypted message is generated for all crew members of the transportation vehicle identified by the identifier and presented to authorized crew member devices logged into a transportation vehicle computing network.

6. The method of claim 1, wherein the transportation vehicle is an aircraft and the computing device is an airline user device that sends the encrypted message to a ground server.

7. The method of claim 6, wherein the ground server transmits the encrypted message to the aircraft and an inflight entertainment system forwards the decrypted message after validation of the passenger seat identifier.

8. The method of claim 6, wherein the encrypted message is generated for all passengers of a specific cabin class of the aircraft identified by an aircraft identifier.

9. The method of claim 1, wherein the transportation vehicle is one of a train, a bus, a ship and a recreation vehicle.

10. A method for communicating with a passenger on an aircraft, the method comprising:

generating an encrypted message by an airline computing device for an aircraft passenger, based on an aircraft identifier identifying the aircraft and a passenger seat identifier identifying a passenger seat;

providing the encrypted message to a ground server;

identifying the aircraft by the ground server and transmitting the encrypted message to an onboard computing device;

decrypting the encrypted message by the onboard computing device;

validating the passenger seat identifier based on an authorized login by the passenger to an inflight entertainment system and pairing of a passenger electronic device with the inflight entertainment system; and after validation, presenting the decrypted message to a device accessible to the passenger by the inflight entertainment system.

11. The method of claim 10, wherein the encrypted message is for all passengers of the aircraft identified by the aircraft identifier.

12. The method of claim 10, wherein when the encrypted message is for a crew member of the aircraft, then the decrypted message is presented to an authorized crew member device connected to an aircraft computing network.

13. The method of claim 10, wherein the encrypted message is generated for all crew members of the aircraft identified by the aircraft identifier and presented to authorized crew member devices logged into an aircraft computing network.

14. The method of claim 10, wherein the encrypted message is generated for all passengers of a specific cabin class of the aircraft identified by the aircraft identifier.

15. The method of claim 10, wherein the encrypted message is generated using a passenger name aboard the aircraft identified by the aircraft identifier.

16. The method of claim 10, wherein the decrypted message is displayed at a seatback device of the aircraft by the inflight entertainment system.

17. A system for communicating a message to a passenger on a vehicle, the system comprising:

an entertainment system carried with the vehicle, the entertainment system including an onboard management system, in which the onboard management system includes a ground communication interface, and a communication module;

a plurality of passenger seats including a seat device for use by a passenger, in which each seat device has a different identifier, the seat device including a display and a seat communication interface in communication with the onboard management system;

a ground server including a communication module in communication with the onboard management system via the ground communication interface of the onboard management system, the ground server including logic which when a message is communicated thereto having an identifier, identifies the vehicle and transmits the message to the onboard management system of the vehicle;

wherein the onboard management system after receiving the message, validates the identifier based on an authorized login by the passenger to an inflight entertainment system and pairing of a passenger electronic device with the inflight entertainment system; and after validation, displays the message on the seat device having that identifier.

18. The system of claim 17, wherein the message is communicated in encrypted format from the ground server to the onboard management system.

19. The system of claim 17, wherein when the message is for a crew member of the vehicle, the message is presented to a crew member device connected to a vehicle computing network.

20. The system of claim 17, wherein the message is generated for all crew members of the vehicle identified by the identifier and presented to authorized crew member devices logged into a vehicle computing network.

* * * * *